(12) United States Patent
Mekid et al.

(10) Patent No.: US 9,135,908 B2
(45) Date of Patent: Sep. 15, 2015

(54) DUAL RESONATOR CHAMBER WITH VARIABLE VOLUME

(71) Applicant: KING FAHD UNIVERSITY OF PETROLEUM AND MINERALS, Dhahran (SA)

(72) Inventors: Samir Mekid, Dhahran (SA); Maaz Farooqui, New Delhi (IN)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 214 days.

(21) Appl. No.: 13/970,488

(22) Filed: Aug. 19, 2013

(65) Prior Publication Data
US 2014/0341385 A1 Nov. 20, 2014

Related U.S. Application Data

(63) Continuation-in-part of application No. 13/898,430, filed on May 20, 2013.

(51) Int. Cl.
| | |
|---|---|
| *G10K 11/16* | (2006.01) |
| *H04R 1/20* | (2006.01) |
| *G10K 11/172* | (2006.01) |
| *H04R 1/28* | (2006.01) |
| *F01N 1/02* | (2006.01) |
| *F01N 1/00* | (2006.01) |
| *F16L 55/033* | (2006.01) |

(52) U.S. Cl.
CPC ............ *G10K 11/161* (2013.01); *G10K 11/172* (2013.01); *H04R 1/2873* (2013.01); *F01N 1/00* (2013.01); *F01N 1/023* (2013.01); *F16L 55/033* (2013.01)

(58) Field of Classification Search
None
See application file for complete search history.

(56) References Cited

U.S. PATENT DOCUMENTS

| | | | | |
|---|---|---|---|---|
| 2,233,804 | A | * | 3/1941 | Bourne .......................... 181/233 |
| 4,539,947 | A | | 9/1985 | Sawada et al. |
| 4,927,342 | A | | 5/1990 | Kim et al. |
| 5,283,398 | A | | 2/1994 | Kotera et al. |
| 5,475,189 | A | | 12/1995 | Field et al. |
| 5,921,081 | A | | 7/1999 | Kim |
| 7,345,594 | B2 | | 3/2008 | Huang et al. |
| 8,897,477 | B1 | * | 11/2014 | Mekid ........................... 381/353 |

(Continued)

FOREIGN PATENT DOCUMENTS

| | | |
|---|---|---|
| DE | 101 43 686 A1 | 3/2003 |
| EP | 0 563 706 A1 | 10/1993 |

(Continued)

*Primary Examiner* — Andrew L Sniezek
(74) *Attorney, Agent, or Firm* — Richard C. Litman (57) ABSTRACT

The dual resonator chamber with variable volume includes first and second housings. The second housing is slidably mounted within the first housing such that a second inner neck portion of the second housing is slidably mounted about the first inner neck portion of the first housing and forms a fluid-tight seal therewith. A sliding wall is slidably mounted within the second housing, dividing the interior thereof into upper and lower resonator chambers. At least one first actuator selectively adjusts the height of the sliding wall with respect to the second lower end of the second housing to selectively adjust volumes of the upper and lower resonator chambers. At least one second actuator selectively adjusts the height of the second housing with respect to the first housing to selectively adjust the neck length of the lower resonator chamber.

2 Claims, 4 Drawing Sheets

(56) References Cited

U.S. PATENT DOCUMENTS

2005/0199439 A1    9/2005  Goenka et al.
2005/0252716 A1    11/2005 Moenssen et al.
2013/0164643 A1*   6/2013  Heo et al. ...................... 429/428
2014/0090922 A1*   4/2014  Fagerlund et al. ............ 181/207

FOREIGN PATENT DOCUMENTS

| | | |
|---|---|---|
| JP | 8-240202 | 9/1996 |
| RU | 2 270 312  C1 | 2/2006 |

* cited by examiner

DUAL RESONATOR CHAMBER WITH VARIABLE VOLUME

CROSS-REFERENCE TO RELATED APPLICATION

This application is a continuation-in-part of U.S. patent application Ser. No. 13/898,430, filed May 20, 2013.

BACKGROUND OF THE INVENTION

1. Field of the Invention

The present invention relates generally to noise reduction devices, and particularly to a dual resonator chamber with variable volume for reducing noise in pipelines.

2. Description of the Related Art

Excessive noise caused by compressors and the like in oil refineries and other industries involving pressurized flow through pipelines can cause distress to the personnel working in such refineries and the like. In addition to physical discomfort, the high noise level can mask emergency alarms and the like, thus creating a hazard in the workplace. Typical noise levels under such conditions may fall in the range of between 70 and 120 dB.

In order to prevent work stoppage due to such noise levels (which tend to increase over the lifetime of the machinery), Helmholtz resonators are often applied to pipes. However, such resonators are typically not tunable, thus requiring replacement of the individual resonators when the flow in the pipes is varied.

Thus, a dual resonator chamber with variable volume and a control method therefor solving the aforementioned problems is desired.

SUMMARY OF THE INVENTION

The dual resonator chamber with variable volume is a noise-reducing chamber for use with pipelines or the like. The dual resonator chamber with variable volume includes a first housing having a first upper wall, at least one first sidewall, and a first lower end. The first lower end is adapted for mounting on a support surface, such as a pipe or the like, and has a first opening formed therethrough. A first inner neck portion is internally mounted on the first lower end about the first opening and projects upwardly therefrom. A second housing has a second upper wall, at least one second sidewall, and a second lower end. The second lower end has a second opening formed therethrough. A second inner neck portion is internally mounted on the second lower end about the second opening and projects upwardly therefrom. The second housing is slidably mounted within the first housing such that the second inner neck portion of the second housing is slidably mounted about the first inner neck portion of the first housing and forms a fluid-tight seal therewith.

A sliding wall is slidably mounted within the second housing. The sliding wall divides the interior of the second housing into upper and lower resonator chambers. The sliding wall has a passage formed therethrough, and a perimeter of the sliding wall contacts an inner surface of the second sidewall of the second housing to form a fluid-tight seal therewith.

At least one first actuator selectively adjusts the height of the sliding wall with respect to the second lower end of the second housing to selectively adjust volumes of the upper and lower resonator chambers. At least one second actuator is further provided for selectively adjusting the height of the second lower end of the second housing with respect to the first lower end of the first housing to selectively adjust the neck length of the lower resonator chamber. The at least one first actuator and the at least one second actuator may be remotely controlled.

In a first mode, where the sliding wall of the dual resonator chamber is raised or lowered fully to create a single, primary resonator chamber, a method of controlling the resonator chamber is as follows: (a) recording a resonant frequency f to be attenuated in non-transitory computer readable memory; (b) randomly selecting a dimensionless area ratio $\lambda$ in the range of $0.1 < \lambda < 1.0$, where $$\lambda = \frac{A2}{A1},$$

A2 being a cross-sectional area of a neck of a resonator chamber and A1 being a cross-sectional area of a primary chamber of the resonator chamber; (c) establishing a first length parameter L1 associated with a height of the primary chamber having a maximum value L1max given by $$L1\max = 0.2756 \frac{c}{f},$$

where c is the speed of sound and $L1 = L1\max - \Delta$, where $\Delta$ is an optimization parameter; (d) establishing a second length parameter L2 associated with a height of the neck of the resonator chamber, where $$L2 = \frac{1}{k}\tan^{-1}\left(\frac{\lambda}{\tan(kL1)}\right);$$

(e) maximizing a transmission loss TL of the resonator chamber in terms of the optimization parameter $\Delta$ to determine a maximized parameter $\Delta$max which maximizes the transmission loss, where $$TL = 10\log_{10}\left[1 + \left(\frac{A2}{2A3} \times \frac{\left(\frac{1}{\lambda}\right)\tan(kL1) + \tan(kL2)}{\left(\frac{1}{\lambda}\right)\tan(kL2)\tan(kL1) - 1}\right)^2\right];$$

calculating the first length parameter L1 as $L1 = L1\max - \Delta\max$; calculating the second length parameter L2 as $$L2 = \frac{1}{k}\tan^{-1}\left(\frac{\lambda}{\tan(k(L1\max - \Delta\max))}\right);$$

(h) if TL is not maximized for all possible values of $\lambda$ in the range $0.1 < \lambda < 1.0$, then returning to step (b), otherwise calculating the height of the primary chamber H1 as $H1 = L1$ and calculating the height of the neck of the resonator chamber H2 as $H2 = L2 - \delta1 - \delta2$, where $\delta2$ is a design parameter given by $\delta2 = 0.48\sqrt{A2}(1 - 1.25\sqrt{\lambda})$ and $\delta1$ is a design parameter given by $$\delta1 = 0.46\frac{\sqrt{A2}}{2};$$

and (i) transmitting a control signal to adjust the height of the primary chamber to H1 and the height of the neck of the resonator chamber to H2.

In a second mode, in which two resonance chambers are defined, the second resonance chamber is defined to have a cross-sectional area of A4 and a height H4. The second neck portion has a cross-sectional area of A5 and a height H3. In this case, the dual resonance chamber is used to attenuate two frequencies f1, f2, which are respectively associated with the first and second resonance chambers. For the first chamber and the first frequency f1, the same procedure described above with respect to the single resonance chamber mode is followed to calculate the optimal values for H1 and H2. A pair of dimensionless ratios γA and γH are then defined as $$\gamma A = \frac{A5}{A2} \text{ and } \gamma H = \frac{H3}{H2}.$$

A ratio $$\frac{\gamma A}{\gamma H}$$

is then selected such that the ratio satisfies the condition $$\left(\frac{f1}{f2}\right)^2 + \left(\frac{f2}{f1}\right)^2 \geq 2\left(1 + 2\left(\frac{\gamma A}{\gamma H}\right)\right).$$

Two more parameters are defined as $$\alpha = \frac{A2}{H2} \text{ and } \beta = \frac{A5}{H3}$$

such that the volumes V1 and V2 of the first and second resonator chambers, respectively, can then be calculated using the combined frequency $f_{1,2}$ as:

$$f_{1,2} = \frac{c}{2\pi\sqrt{2}} \sqrt{\left(\frac{\alpha}{V1} + \frac{\beta}{V1} + \frac{\beta}{V2}\right) \pm \sqrt{\left(\frac{\alpha}{V1} + \frac{\beta}{V1} + \frac{\beta}{V2}\right)^2 - 4\left(\frac{\alpha}{V1}\right)\left(\frac{\beta}{V2}\right)}}.$$

The transmission loss TL may then be plotted with respect to α and β as $$TL = 20\log_{10}\left\{1 + \alpha\left[2A3\left(ik + \frac{\alpha}{ikV1}\left(1 - \frac{V2}{V2 + V1 - \frac{V2 \cdot V1 \cdot k^2}{\beta}}\right)\right)\right]^{-1}\right\}.$$

From the transmission loss plot, the optimum $$\frac{\beta}{\alpha}$$

ratio can be calculated. However, $$\frac{\beta}{\alpha} = \frac{\gamma A}{\gamma H},$$

thus the design parameters of the resonators may be calculated based on the values of the ratio $$\frac{\gamma A}{\gamma H}.$$

These and other features of the present invention will become readily apparent upon further review of the following specification.

DETAILED DESCRIPTION OF THE PREFERRED EMBODIMENTS

Figure 1:
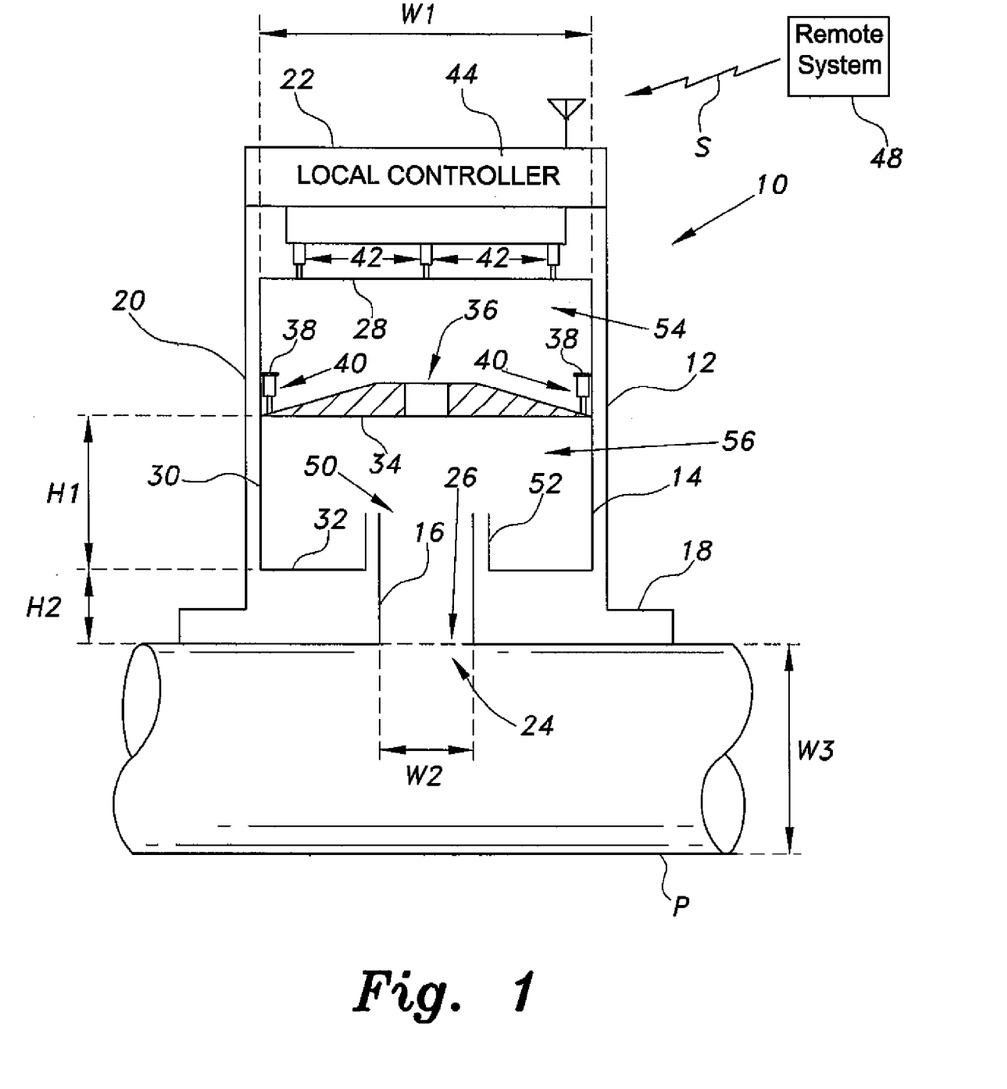
FIG. 1 is a diagrammatic side view in section of a dual resonator chamber with variable volume according to the present invention.

The dual resonator chamber with variable volume 10 is a noise-reducing chamber for use with pipelines or the like. FIG. 1 illustrates the dual resonator chamber 10 mounted on an exemplary pipe P. The dual resonator chamber 10 includes a first housing 12 having a first upper wall 22, at least one first sidewall 20 and a first lower end 18. FIG. 1 diagrammatically shows the first housing 12 being a substantially cylindrical, although it should be understood that the first housing 12 may have any desired shape. The first lower end 18 is adapted for mounting on a support surface, such as the outer surface of the exemplary pipe P or the like, and has a first opening 26 formed therethrough. As shown, the first opening 26 is preferably formed substantially centrally with respect to the first lower end 18. A first inner neck portion 16 is internally mounted on the first lower end 18 about the first opening 26 and projects upwardly therefrom. As shown, the first opening 26 is aligned with an opening 24 formed through the pipe P.

A second housing 14 is further provided. The second housing 14 has a second upper wall 28, at least one second sidewall 30 and a second lower end 32. FIG. 1 diagrammatically shows the second housing 14 being substantially cylindrical, although it should be understood that the second housing 14 may have any desired shape. The second lower end 32 has a second opening 50 formed therethrough. As shown, the second opening 50 is preferably formed substantially centrally with respect to the second lower end 32. A second inner neck portion 52 is internally mounted on the second lower end 32 about the second opening 50 and projects upwardly therefrom. The second housing 14 is slidably mounted within the first housing 12 such that the second inner neck portion 52 of the second housing 14 is slidably mounted about the first inner neck portion 16 of the first housing 12 and forms a fluid-tight seal therewith.

A sliding wall 34 is slidably mounted within the second housing 14. In FIG. 1, the sliding wall 34 is shown as having a substantially trapezoidal cross-sectional configuration, although it should be understood that the sliding wall 34 may have any desired shape. The sliding wall 34 divides the interior of the second housing 14 into upper and lower resonator chambers 54, 56, respectively. The sliding wall 34 has a passage 36 formed therethrough, forming a neck portion between the upper and lower resonator chambers 54, 56. As shown, the perimeter of the sliding wall 34 contacts the inner surface of the second sidewall 30 of the second housing 14 to form a fluid-tight seal therewith. As shown, the passage 36 is preferably formed substantially centrally with respect to the sliding wall 34.

At least one first actuator 40 selectively adjusts the height H1 of the sliding wall 34 with respect to the second lower end 32 of the second housing 14 to selectively adjust the volumes of the upper and lower resonator chambers 54, 56, respectively. Similarly, at least one second actuator 42 is further provided for selectively adjusting the height H2 of the second lower end 32 of the second housing 14 with respect to the first lower end 18 of the first housing 12 to selectively adjust the neck length of the lower resonator chamber 56.

In FIG. 1, the actuators 40 are shown as being pneumatic cylinders secured by brackets 38 to the inner surface of the second sidewall 30. It should be understood that the pneumatic cylinders are shown for exemplary purposes only, and that any suitable type of actuator, such as a linear actuator or the like, or any other suitable type of motor, gear system, drive or the like may be utilized for selectively and adjustably controlling the height H1 of the sliding wall 34. Similarly, in FIG. 1, the actuators 42 are shown as being pneumatic cylinders secured between the first upper wall 22 and the second upper wall 28. It should be understood that the pneumatic cylinders are shown for exemplary purposes only, and that any suitable type of actuator, such as a linear actuator or the like, or any other suitable type of motor, gear system, drive or the like may be utilized for selectively and adjustably controlling the height H2 of the lower end 32 of the second housing 14.

The at least one first actuator 40 and the at least one second actuator 42 may be controlled locally by a local controller 44, which may be any suitable type of controller, such as that associated with a computer, a programmable logic controller or the like. Alternatively, the at least one first actuator 40 and the at least one second actuator 42 may be remotely controlled by wired or wireless signals S transmitted by a remote system 48 and received by an antenna, a transponder or the like associated with the local controller 44.

When used in combination with a pipeline in particular, the dual resonator 10 is used for noise reduction. The volumes of the upper and lower resonator chambers 54, 56 are controllably adjusted in response to the passing blade frequency associated with the pipe P and/or acoustic power associated with flow through pipe P.

Figure 2:
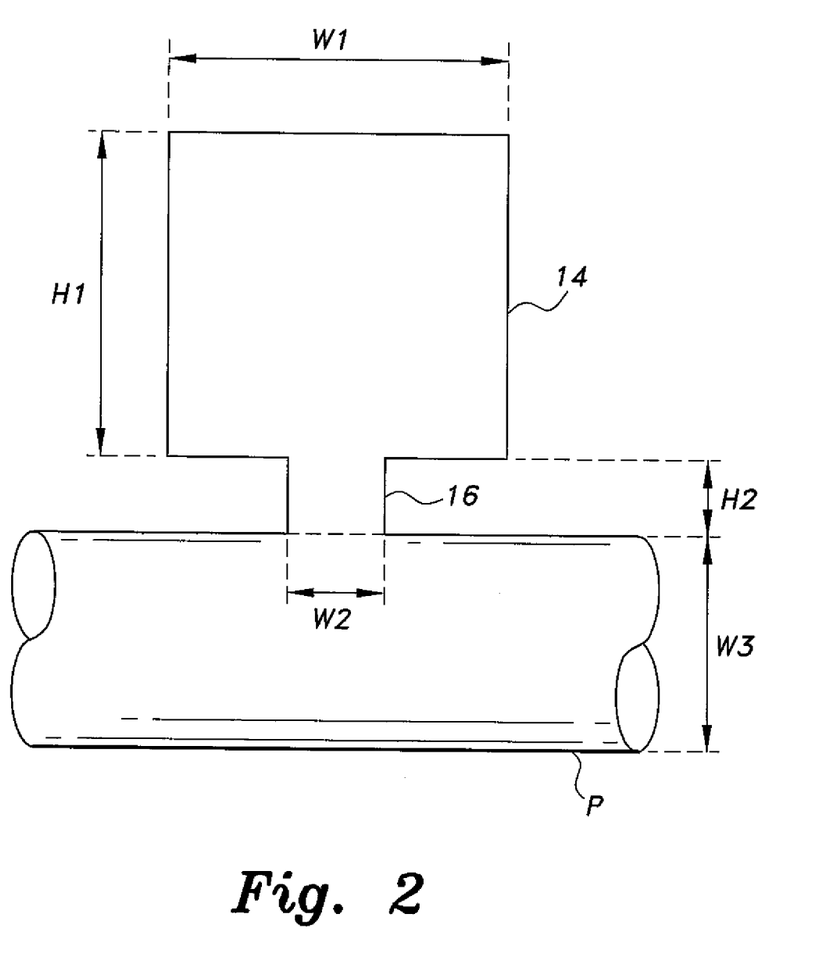
FIG. 2 diagrammatically illustrates the dual resonator chamber with variable volume of FIG. 1 being used as a single resonator chamber.

In order to simplify the development of a control method for the dual resonator 10 of FIG. 1, we may first examine the case of a single resonator chamber, as schematically illustrated in FIG. 2. If the sliding wall 34 of FIG. 1 is raised to its maximum height, the dual resonator 10 acts a single resonator chamber, as schematically illustrated in FIG. 2. In FIG. 2, the single resonator chamber has a height H1 and a neck of length H2. The first step in the control method is the selection of a desired resonating frequency f. Typically, in industrial applications, machines produce tonal noise with frequencies being determined by the angular frequency of passing blades, for example. This acoustic frequency can be measured, resulting in the frequency f which needs to be attenuated. The Helmholtz resonator(s) is then designed to attenuate this selected frequency.

In FIG. 2, the resonator chamber has a width W1, the neck portion 16 has a width W2 (the diameter of the neck for a cylindrical neck), and the pipe P has a width W3 (the diameter of the pipe P for a cylindrical pipe). For a cylindrical resonator chamber, a cylindrical neck and a cylindrical pipe, we can then define respective associated cross-sectional areas $$A1 = \pi\left(\frac{W1}{2}\right)^2, A2 = \pi\left(\frac{W2}{2}\right)^2, \text{ and } A3 = \pi\left(\frac{W3}{2}\right)^2.$$

A dimensionless area ratio $\lambda$ is then defined as $$\lambda = \frac{A2}{A1},$$

and $\lambda$ is assumed to be in the range $0.1<\lambda<1.0$. The value of $\lambda$ may be initially randomly selected in this range.

A maximum value of a length parameter L1 associated with height H1 can be determined by the condition $$f < 0.2756\frac{c}{L1},$$

where c is the speed of sound. The maximum value of length parameter L1 is defined as L1max. L1max is a maximum value for L1, and L1 may be defined as L1=L1max−Δ, where Δ is a small length parameter. A second length parameter L2 is also associated with height H2. The length parameter L2 may be calculated as $$L2 = \frac{1}{k}\tan^{-1}\left(\frac{\lambda}{\tan(kL1)}\right) = \frac{1}{k}\tan^{-1}\left(\frac{\lambda}{\tan(k(L1\max - \Delta))}\right),$$

where k is the wavenumber, given by $$k = \frac{2\pi f}{c}.$$

The transmission loss TL for the single resonator chamber attenuator is given by $$TL = 10\log_{10}\left[1 + \left(\frac{A2}{2A3} \times \frac{(1/\lambda)\tan(kL1) + \tan(kL2)}{(1/\lambda)\tan(kL2)\tan(kL1) - 1}\right)^2\right].$$

In order to attenuate sound, the transmission loss TL should be maximized. Thus, optimization is performed on TL via genetic algorithms or the like to select the value of Δ which maximizes TL. Once the value of Δ is know which maximizes TL, both L1 and L2 may be calculated. The process may return to the selection of λ and be repeated until TL is maximized for all possible values of λ in the range $0.1<\lambda<1.0$.

In order to translate the length parameters L1 and L2 into design parameters for H1 and H2, a pair of end correction factors δ1, δ2 are introduced such that H2=L2−δ1−δ2. δ2 is given by $\delta2=0.48W\sqrt{\sqrt{A2}}(1-1.25\sqrt{\lambda})$, and δ1 is given by $$\delta1 = 0.46\frac{\sqrt{A2}}{2}.$$

H1 is equal to L1.

Figure 3:
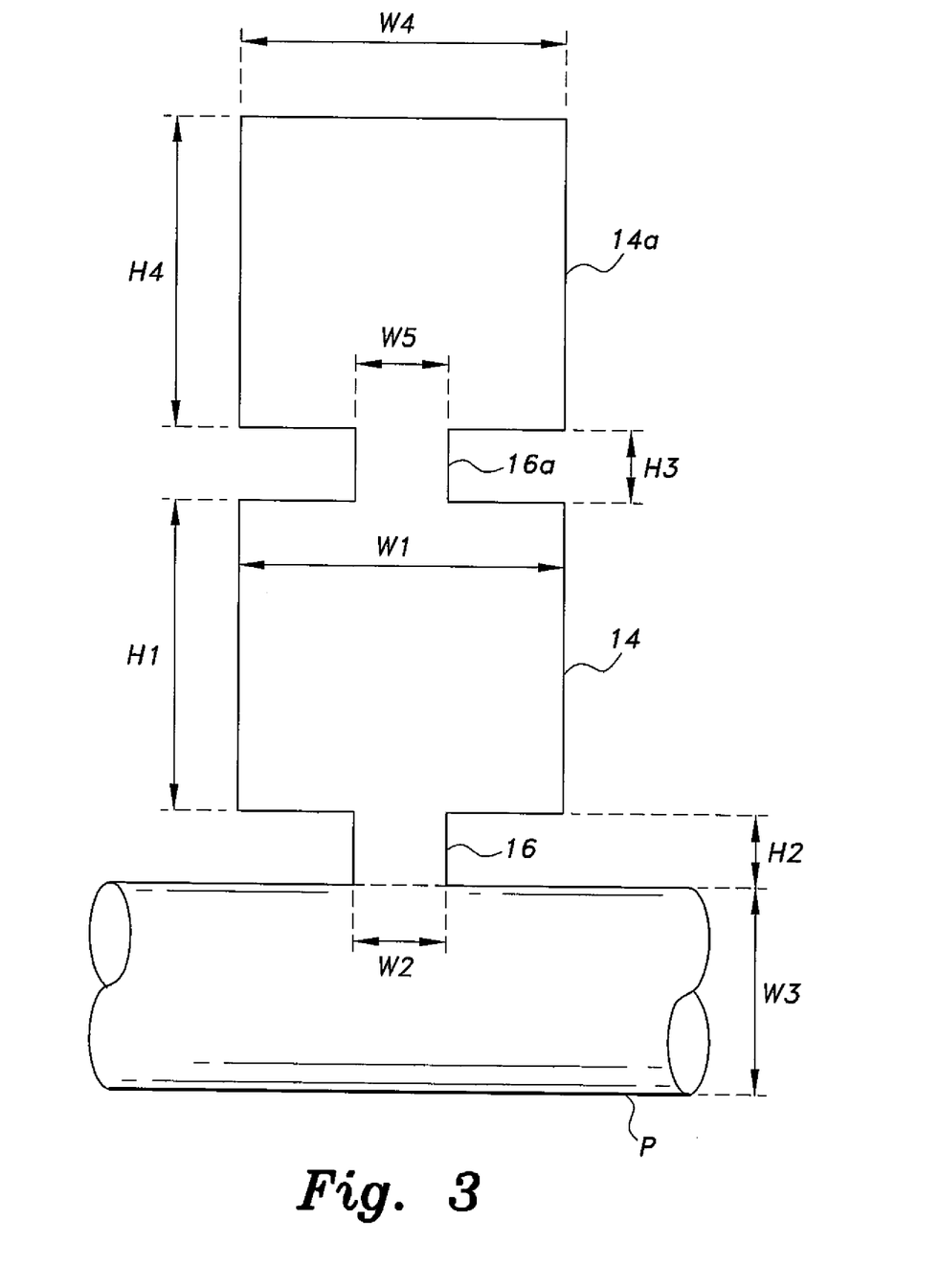
FIG. 3 diagrammatically illustrates the dual resonator chamber with variable volume of FIG. 1 being used as a single resonator chamber.

FIG. 3 schematically illustrates the dual resonator chamber 10 being used in a dual resonance mode, with the sliding wall 34 being used to define two chambers 14 and 14A which are separated by, and communicate with one another by, neck portion 16A. The second resonance chamber has a width W4 (equal to the diameter for a cylindrical chamber), and a height H4. The neck portion 16A has a width W5 (equal to the diameter for a cylindrical neck) and a height H3. In this case, the dual resonance chamber is used to attenuate two frequencies f1, f2, which are respectively associated with chamber 14 and chamber 14A.

For the first chamber and the first frequency f1, the same procedure described above with respect to FIG. 2 (for the single resonance chamber) is followed to calculate the optimal values for H1, W1, H2 and W2. Similar to the procedure followed above, for a cylindrical second resonator chamber and a neck, we can then define respective associated cross-sectional areas $$A4 = \pi\left(\frac{W4}{2}\right)^2 \text{ and } A5 = \pi\left(\frac{W5}{2}\right)^2.$$

A pair of dimensionless ratios γA and γH are then defined as $$\gamma A = \frac{A5}{A2} \text{ and } \gamma H = \frac{H3}{H2}.$$

A ratio $$\frac{\gamma A}{\gamma H}$$

is then selected such that the ratio satisfies the condition $$\left(\frac{f1}{f2}\right)^2 + \left(\frac{f2}{f1}\right)^2 \geq 2\left(1 + 2\left(\frac{\gamma A}{\gamma H}\right)\right).$$

Two more parameters are defined as $$\alpha = \frac{A2}{H2} \text{ and } \beta = \frac{A5}{H3}$$

such mar me volumes V1 and V2 of the first and second resonator chambers, respectively, can then be calculated using the combined frequency $f_{1,2}$ as:

$$f_{1,2} = \frac{c}{2\pi\sqrt{2}} \sqrt{\left(\frac{\alpha}{V1} + \frac{\beta}{V1} + \frac{\beta}{V2}\right) \pm \sqrt{\left(\frac{\alpha}{V1} + \frac{\beta}{V1} + \frac{\beta}{V2}\right)^2 - 4\left(\frac{\alpha}{V1}\right)\left(\frac{\beta}{V2}\right)}}.$$

The transmission loss TL may then be plotted with respect to α and β as:

$$TL = 20\log_{10}\left\{1 + \alpha\left[2A3\left(ik + \frac{\alpha}{ikV1}\left(1 - \frac{V2}{V2 + V1\frac{V2 \cdot V1 \cdot k^2}{\beta}}\right)\right)\right]^{-1}\right\}.$$

From the transmission loss plot, the optimum $$\frac{\beta}{\alpha}$$

ratio can be calculated. However, $$\frac{\beta}{\alpha} = \frac{\gamma A}{\gamma H},$$

thus the design parameters of the resonators may be calculated based on the values of the ratio $$\frac{\gamma A}{\gamma H}.$$

Figure 4:
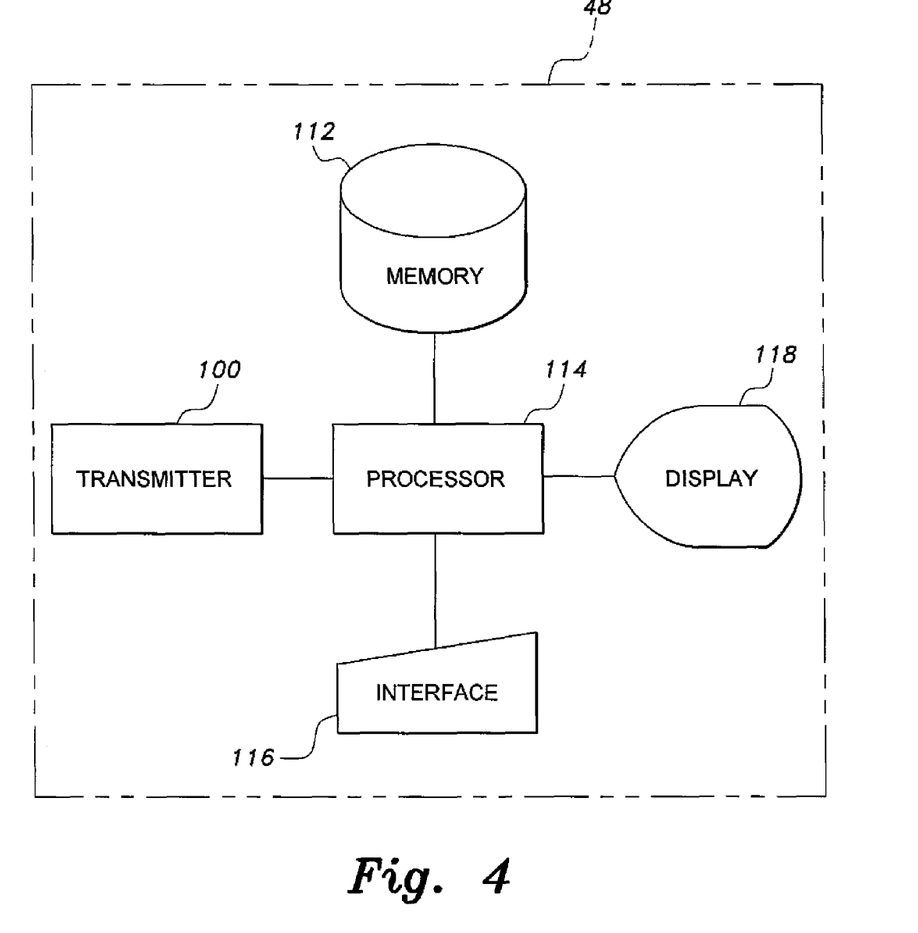
FIG. 4 diagrammatically illustrates a system for implementing a control method of the dual resonator chamber with variable volume.

It should be understood that the calculations may be performed by any suitable computer system, such as that diagrammatically shown in FIG. 4 as part of remote system 48. Data is entered into system 48 via any suitable type of user interface 116, and may be stored in memory 112, which may be any suitable type of computer readable and programmable memory and is preferably a non-transitory, computer readable storage medium. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112, a transmitter 100 or a transceiver, along with any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

It is to be understood that the present invention is not limited to the embodiments described above, but encompasses any and all embodiments within the scope of the following claims.

We claim:
1. A method of controlling a resonator chamber with variable volume, comprising the steps of:
    (a) recording a resonant frequency f to be attenuated in non-transitory computer readable memory;
    (b) randomly selecting a dimensionless area ratio λ in the range of 0.1<λ<1.0, wherein

$$\lambda = \frac{A2}{A1},$$

A2 being a cross-sectional area of a neck of a resonator chamber and A1 being a cross-sectional area of a primary chamber of the resonator chamber;
    (c) establishing a first length parameter L1 associated with a height of the primary chamber having a maximum value L1max given by $$L1\max = 0.2756\frac{c}{f},$$

where c is the speed of sound and L1=L1max−Δ, where Δ is an optimization parameter;
    (d) establishing a second length parameter L2 associated with a height of the neck of the resonator chamber, wherein $$L2 = \frac{1}{k}\tan^{-1}\left(\frac{\lambda}{\tan(kL1)}\right),$$

where k is the wavenumber given by k=2π/c;
    (e) maximizing a transmission loss TL of the resonator chamber in terms of the optimization parameter Δ to determine a maximized parameter Δmax which maximizes the transmission loss, wherein $$TL = 10\log_{10}\left[1+\left(\frac{A2}{2A3}\times\frac{\left(\frac{1}{\lambda}\right)\tan(kL1)+\tan(kL2)}{\left(\frac{1}{\lambda}\right)\tan(kL2)\tan(kL1)-1}\right)^2\right];$$

(f) calculating the first length parameter L1 as L1=L1max−Δmax;
    (g) calculating the second length parameter $$L2 \text{ as } L2 = \frac{1}{k}\tan^{-1}\left(\frac{\lambda}{\tan(k(L1\max-\Delta\max))}\right);$$

(h) if TL is not maximized for all possible values of λ in the range 0.1<λ<1.0, then returning to step (b), otherwise calculating the height of the primary chamber H1 as H1=L1 and calculating the height of the neck of the resonator chamber H2 as H2=L2−δ1−δ2, where δ2 is a design parameter given by δ2=0.48√A2(1−1.25√λ) and δ1 is a design parameter given by $$\delta 1 = 0.46\frac{\sqrt{A2}}{2};$$

and
    (i) transmitting a control signal to adjust the height of the primary chamber to H1 and the height of the neck of the resonator chamber to H2.

2. A computer software product that includes a non-transitory storage medium readable by a processor, the non-transitory storage medium having stored thereon a set of instructions for controlling a resonator chamber with variable volume, the instructions comprising:
    (a) a first set of instructions which, when loaded into main memory and executed by the processor, causes the processor to record a resonant frequency f to be attenuated in non-transitory computer readable memory;
    (b) a second set of instructions which, when loaded into main memory and executed by the processor, causes the processor to randomly select a dimensionless area ratio λ in the range of 0.1<λ<1.0, wherein $$\lambda = \frac{A2}{A1},$$

A2 being a cross-sectional area of a neck of a resonator chamber and A1 being a cross-sectional area of a primary chamber of the resonator chamber;
    (c) a third set of instructions which, when loaded into main memory and executed by the processor, causes the processor to establish a first length parameter L1 associated with a height of the primary chamber having a maximum value L1max given by $$L1\max = 0.2756\frac{c}{f},$$

where c is the speed of sound and L1=L1max−Δ, where Δ is an optimization parameter;
    (d) a fourth set of instructions which, when loaded into main memory and executed by the processor, causes the processor to establish a second length parameter L2 associated with a height of the neck of the resonator chamber, wherein $$L2 = \frac{1}{k}\tan^{-1}\left(\frac{\lambda}{\tan(kL1)}\right),$$

where k is the wavenumber given by k=2π/c;
    (e) a fifth set of instructions which, when loaded into main memory and executed by the processor, causes the processor to maximize a transmission loss TL of the resonator chamber in terms of the optimization parameter Δ to determine a maximized parameter Δmax which maximizes the transmission loss, wherein $$TL = 10\log_{10}\left[1 + \left(\frac{A2}{2A3} \times \frac{\left(\frac{1}{\lambda}\right)\tan(kL1) + \tan(kL2)}{\left(\frac{1}{\lambda}\right)\tan(kL2)\tan(kL1) - 1}\right)^2\right];$$

(f) a sixth set of instructions which, when loaded into main memory and executed by the processor, causes the processor to calculate the first length parameter L1 as L1=L1max−Δmax;

(g) a seventh set of instructions which, when loaded into main memory and executed by the processor, causes the processor to calculate the second length parameter $$L2 \text{ as } L2 = \frac{1}{k}\tan^{-1}\left(\frac{\lambda}{\tan(k(L1max - \Delta max))}\right);$$

(h) an eighth set of instructions which, when loaded into main memory and executed by the processor, causes the processor to return to the second set of instructions if TL is not maximized for all possible values of λ in the range 0.1<λ<1.0, and otherwise to calculate the height of the primary chamber H1 as H1=L1 and calculating the height of the neck of the resonator chamber H2 as H2=L2−δ1−δ2, where β2 is a design parameter given by δ2=0.48√A2(1−1.25√λ) and δ1 is a design parameter given by $$\delta 1 = 0.46\frac{\sqrt{A2}}{2};$$

and (i) a ninth set of instructions which, when loaded into main memory and executed by the processor, causes the processor to transmit a control signal to adjust the height of the primary chamber to H1 and the height of the neck of the resonator chamber to H2.

\* \* \* \* \*